June 6, 1961 A. V. KLANCNIK 2,986,957

MACHINE TOOLS

Filed March 9, 1959 3 Sheets-Sheet 1

INVENTOR.
ADOLPH V. KLANCNIK
BY
Wallace and Cannon

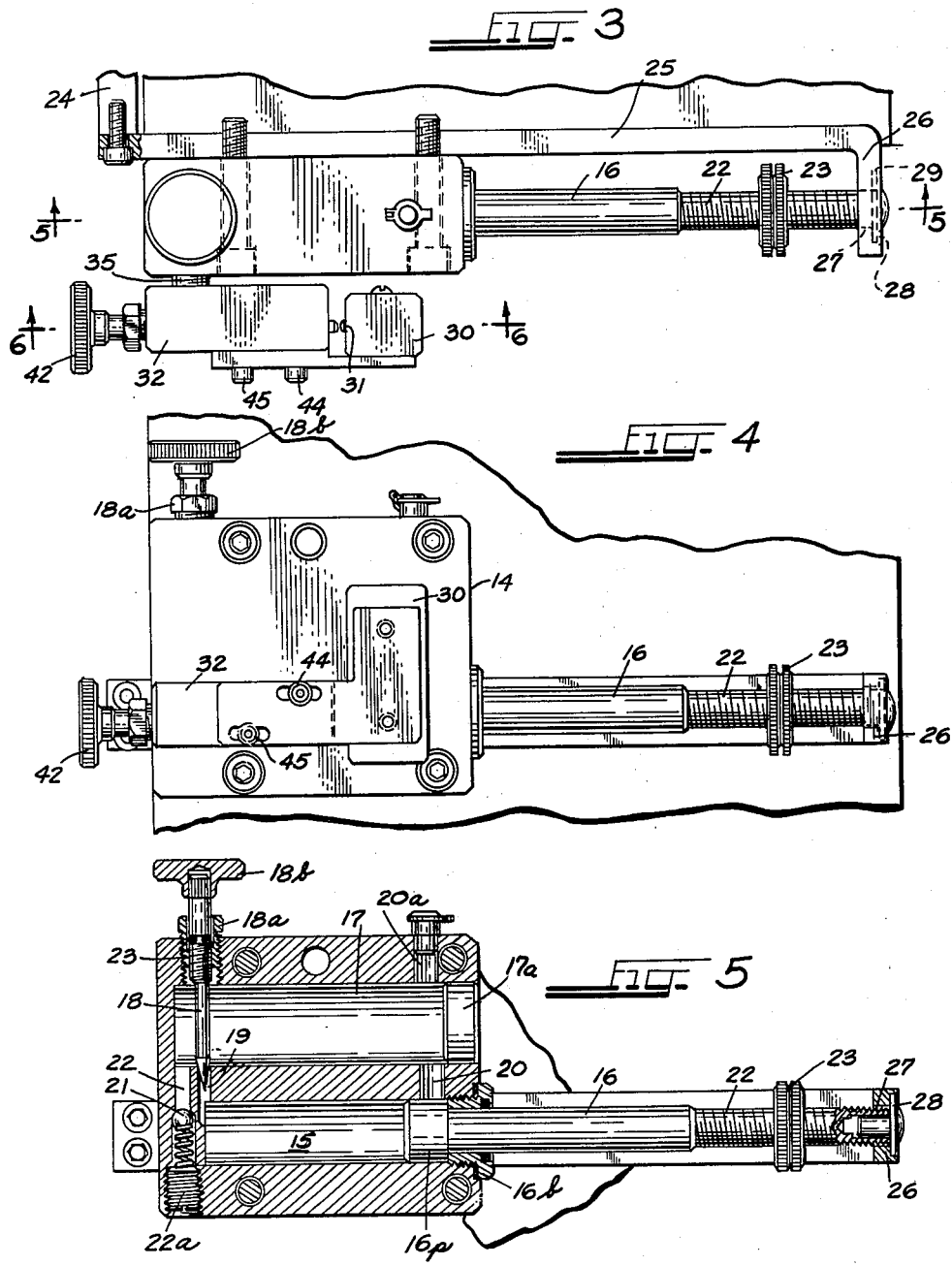

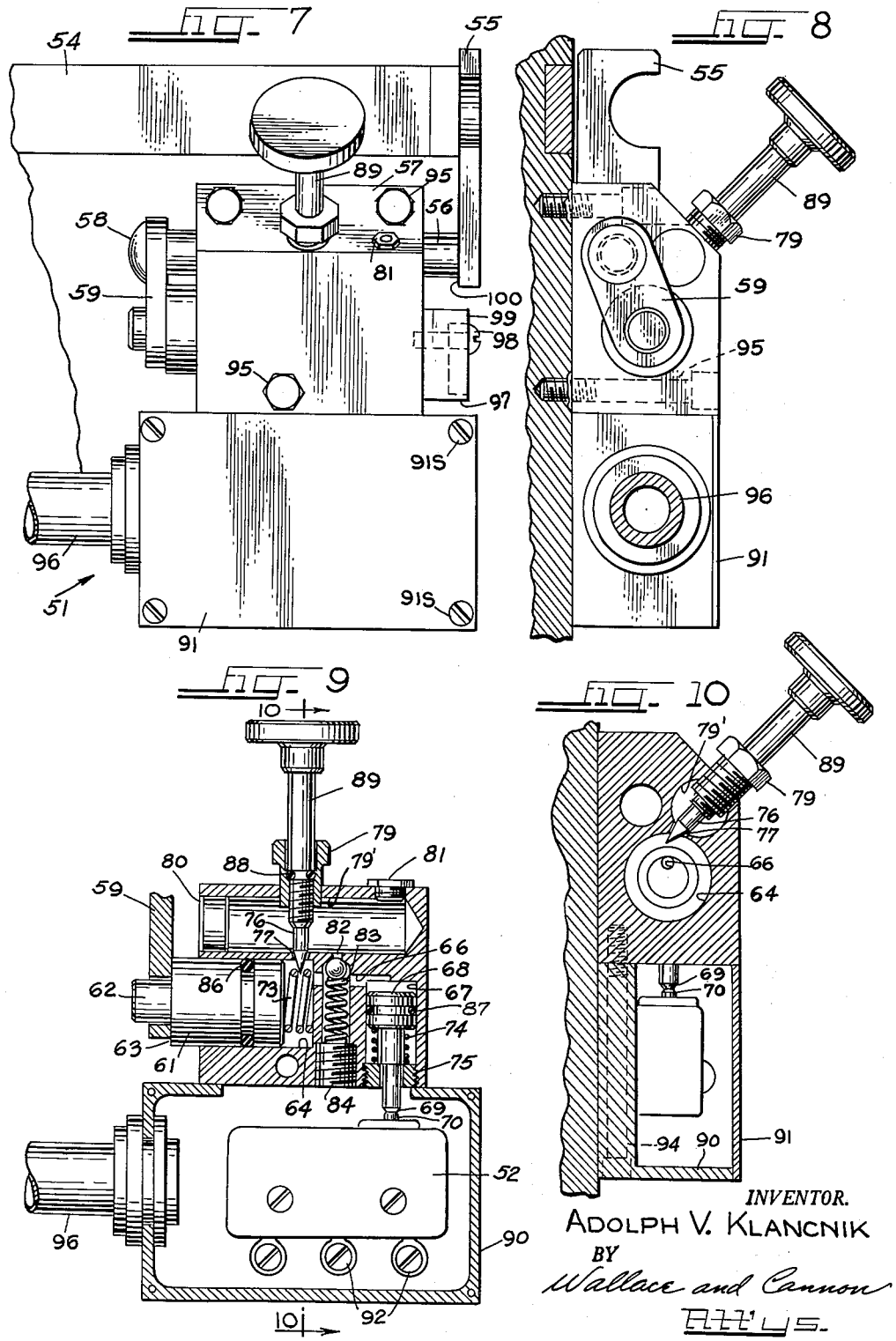

# United States Patent Office 2,986,957
Patented June 6, 1961

2,986,957
MACHINE TOOLS
Adolph V. Klancnik, 1020 Glenview Road, Glenview, Ill.
Filed Mar. 9, 1959, Ser. No. 797,933
14 Claims. (Cl. 77—32.5)

This invention relates to a control for automatic machine tools wherein a tool is mounted for reciprocating automatically controlled strokes toward and away from a work piece incidental to tapping, broaching, reaming or like operations performed on the work piece. This application is a continuation-in-part of application Serial No. 756,941 filed August 25, 1958, issued as Patent No. 2,954,851, dated October 4, 1960.

One of the more common forms of machine tools is one wherein a drill or like rapidly rotating tool is mounted for rotation at the end of a piston which is mounted in a cylinder for forward and reverse strokes relative to the work piece being operated upon by the tool. Thus, when the work piece is to be subjected to the function of the tool the chuck in which the tool is gripped is set in rotary motion, and the piston which carries the chuck is subjected to its forward stroke causing the tool to engage the work piece. It may be that an opening or recess is being drilled, an opening is being counter-sunk, an end is being rounded off or chamfered, and so on, and in many of these operations it is desirable that there be a slight dwell of the rotating tool at the bottom of its stroke, say for ten revolutions or so, either to account for accurate depth control over a drilled opening or final smoothing of the surfaces that were operated on by the tool. It is often desirable that there be a slight dwell of the rotating tool at the opposite, top end of its stroke to enable the working cycle of the machine to be set at its maximum efficient point relative to tool life, production and operation and to facilitate synchronizing the actuating and clamping action of the work fixture with the spindle cycle to allow sufficient time for unloading the work piece. This slight amount of top dwell can also be used to enable the worker to become accustomed to the use of the machine. One of the primary objects of the present invention is to enable such dwell of the rotating tool to be controlled in a relatively simple, inexpensive and efficient manner, and to be able to establish a great deal of accuracy in the amount of dwell.

It is also common practice in this art to associate a dash pot with the piston which carries the rotating tool for various different purposes, but for the most part such dash pot control accounts for increasing resistance to the forward stroke of the piston just prior to and during the time that the drill or other tool is engaging the work piece while performing the essential machining operation. For example, it is common to utilize dash pot resistance at a time just prior to the drill breaking through the far side of the work piece, and also to exert dash pot resistance on the drill at the moment it engages the work piece. Moreover, it is advantageous to cut out the dash pot or at least to account for a release of its resistance during the time that the piston is on its reverse or back stroke, since this greatly speeds up operation of the machine. Another object of the present invention is to construct a relatively simple and inexpensive dash pot for use in machine tools, and to associate with this dash pot the depth control or dwell control devices referred to above.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 3 is a detailed plan view of the bottom dwell portion of the system illustrated in FIG. 1;

FIG. 4 is a side elevation of the assembly illustrated in FIG. 3;

FIG. 5 is a sectional view of the assembly illustrated in FIG. 3 taken on section lines 5—5 of FIG. 3;

FIG. 7 is a side elevation of the top dwell assembly;

FIG. 8 is an end elevation of the top dwell assembly;

FIG. 9 is a detail sectional view taken in the direction of the arrows 9—9 of FIG. 8; and FIG. 10 is a detailed sectional view taken in the direction of the arrows 10—10 of FIG. 9.

Figure 1:
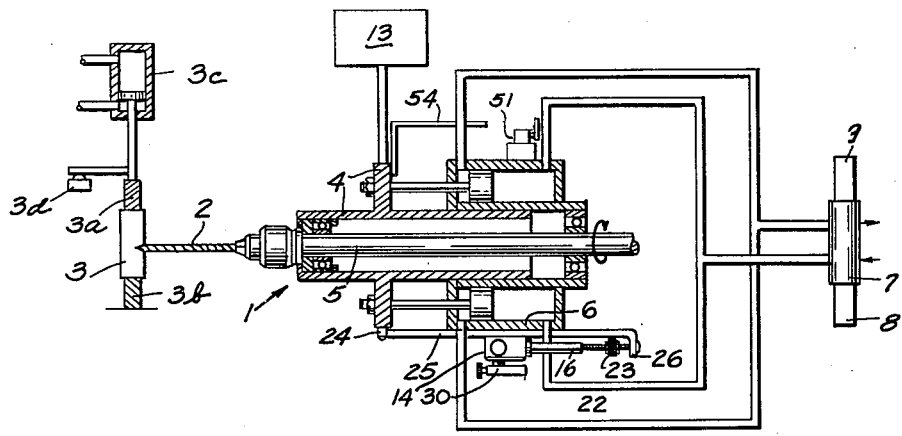
FIG. 1 is a schematic view of a reciprocatory machine tool equipped with the present invention.

With particular reference now to the drawings and in the first instance to FIG. 1, there is generally designated at 1 a reciprocating machine tool which may be a drill, reamer, broaching tool or the like. The cutting tool 2 thereof is adapted to be advanced toward and away from a work piece 3 by means of a so-called platen 4 having a spindle 5 rotatably mounted therein. Any suitable power means, not shown, may be provided to rotate the tool-carrying spindle. Tools of this type are customarily provided with some power means for advancing the tool toward the work piece and retracting it therefrom and in the embodiment of the invention illustrated in the drawings this means is shown as a pair of fluid cylinders 6 having the pistons thereof connected to the platen 4. Fluid, which may be air, is selectively admitted to one end or the other of the cylinder means 6 under control of a suitable 4-way valve 7. The valve may utilize a first solenoid 8 for shifting the valve spool to one limit to admit fluid to the upper ends of the cylinders illustrated, thereby causing advance movement of the tool. A second solenoid 9 may, when energized, shift the valve spool in the opposite direction so as to admit fluid to the other end of the cylinders 6 for causing retracting movement of the tool 2.

Figure 2:
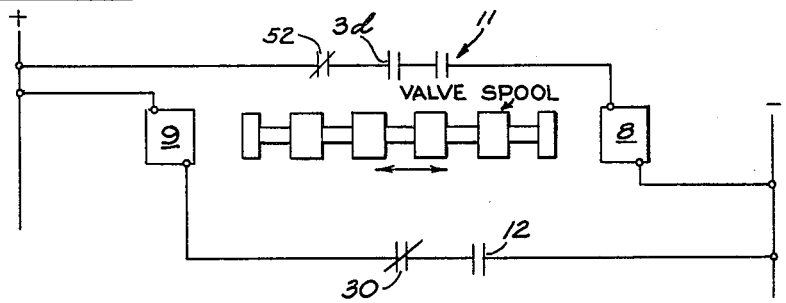
FIG. 2 is a schematic diagram of a tool control circuit used in the invention.

Machine tools of this character usually include an automatic work holding mechanism in the form of relatively movable jaws diagrammatically represented at 3a and 3b. A fluid cylinder 3c is adapted to move one jaw 3a toward the other to grip the work piece therebetween. A switch 3d, FIG. 2, is in the circuit to the advancing solenoid 8 and is closed when the work piece is firmly held by the jaws, thus conditioning the advancing solenoid circuit for operation. In place of or in addition to the switch 3d a switch 52 responsive to the action of the top dwell unit 51 may be added. Systems of this character may also include a manual on-and-off switch (not shown) in the circuit to the solenoids and tool reversing switches 11 and 12, which as shown in FIG. 2 are in circuit with the solenoids 8 and 9, respectively. One switch 12 may be actuated when the tool reaches a predetermined point in its travel as, for example, that point in the movement of the tool corresponding to the maximum penetration of the tool in the work piece. The switch 12 is closed, at that time, thus energizing the solenoid 9 to shift the valve and cause return movement of the tool. The switch 11, on the other hand, will only be closed for energizing the solenoid 8 when the tool is at the opposite or retracted position of movement, thus automatically reversing the tool. A switch actuating mechanism, diagrammatically represented at 13 in FIG. 1 is interconnected with the tool carrying platen 4 in such a manner that switch 12 is closed at the end of the advancing stroke while switch 11 is opened, while at the end of the retracting stroke switch 11 is closed while switch 12 is opened. Machine tool systems of this character are designed for automatic, continuously reciprocating operation.

These hole forming tools are usually provided with some form of dash pot control device which retards movement of the tool at some preselected stage of operation near the end of its work performing stroke so as to avoid a breakthrough. In accordance with the invention, a dash pot 14 is mounted on the main cylinder of the machine tool. The dash pot includes a cylinder 15 formed therein, and a plunger 16 having a piston head 16P adapted for reciprocal axial movement in the cylinder 15. The dash pot includes a reservoir 17, the axis of which is parallel to the axis of the cylinder 15 and which contains a suitable hydraulic fluid.

Both the cylinder space and reservoir space in the dash pot may be cast with the block or they may be formed from drilling. A plug 17a closes one end of the reservoir.

A needle valve 18 is adapted for adjustably restricting flow of fluid from one end of the dash pot cylinder through a passage 19 so that during movement of the plunger 16 to the left, as illustrated in FIG. 5, fluid will be forced from the cylinder 15 through the restricted passage 19 and into the reservoir. Thus, the restriction for the escape of the fluid retards movement of the plunger toward the left. The other or right-hand end of the cylinder 15 communicates through a drain passage 20 with the reservoir so that upon movement of the plunger to the right fluid is forced through the passage 20 without restriction and into the reservoir. The drain port may be drilled through the wall between the cylinder and reservoir at the same time that an aligned filling opening 20a is formed.

A spring-biased check valve 21 is provided in a passage 22 which establishes communication between the reservoir and the needle valve end of the dash pot cylinder, so that upon return movement of the plunger 16 fluid readily flows through the passage 22 and into the dash pot chamber or cylinder. The check valve prevents opposite flow of fluid from the cylinder to the reservoir. A plug 22a closes the bore leading to the check valve passage, and the needle valve 18 is advantageously threadably mounted in a nut plug 23 in turn threadedly mounted in the dash pot housing, so that by turning the head 18b of the needle valve, the point of this valve is moved toward and away from the passage 19 so as to vary the size of the restricted opening and thus vary the retarding resistance offered to the flow of hydraulic fluid from the dash pot chamber.

The plunger 16 is supported for sliding movement in a bearing 16b in the dash pot and extends outwardly from the dash pot housing. The end of the plunger opposite the piston part 16p is threaded as at 22 and carries adjustable stops 23 in threaded engagement with the portion 22. In order to cause movement of the plunger within the cylinder and toward the left and thus retard movement of the tool during its advancing stroke, a spider 24 (see FIG. 1) may be fixed to the tool carrying platen. An arm 25 is fixed to the spider 24 and includes an off-set portion 26, FIG. 3, at one end thereof which is adapted for abutting engagement with the stops 23 at a predetermined point of the movement of the tool. As the tool advances in its work performing operation, the arm 25 may move to the left as seen in FIG. 3 and engage the stops 23 near the end of its work performing stroke and force the piston 16p to the left in the cylinder 15. Thus the plunger and dash pot will retard the final movement of the tool. By threadably adjusting the position of the stops 23 on the plunger, the point in the travel of the tool at which the dash pot is actuated may be selectively varied in accordance with the desired length of the work performing stroke of the tool and in accordance with the amount of movement desired to be retarded.

The off-set portion 26 of the arm 25 has a bore 27 through which the outer end of the plunger 16 is received. The plunger preferably carries a washer 28 at its extreme outer end which is adapted to seat in a recess 29 in the end of the off-set portion 26. Thus, after the arm 25 has moved to the left during the work performing stroke of the tool and caused inward movement of the dash pot plunger and then moves to the right during the retracting stroke of the tool the surface of the recess 29 will engage the washer 28 and force the plunger of the dash pot to the right, thus setting up the plunger for the next work performing stroke of the tool.

Pressure responsive means are provided for deenergizing the circuit controlling the solenoid 9 which during energization thereof actuates the valve 7 to cause retracting movement of the tool. Thus, a normally closed micro switch 30 is mounted on one side of the dash pot housing and includes an actuating member 31 which when depressed opens the switch. The switch 30 is in the wiring leading to the solenoid 9. When the switch 30 is open, the circuit to the solenoid controlling the retracting movement of the tool is deactivated.

Figure 6:
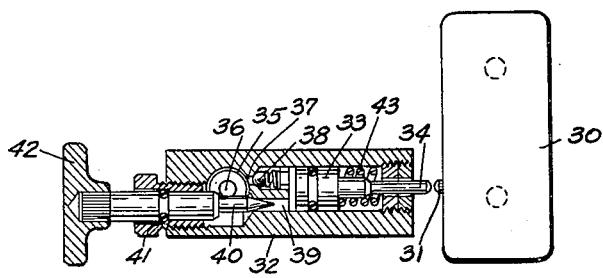
FIG. 6 is a detailed sectional view of a switch actuating mechanism utilized in the present invention and taken substantially on the section lines 6—6 of FIG. 3.

Means are provided for opening the switch 30 and holding it open for a period of time corresponding to the desired period of dwell time of the tool in the work piece. To this end, an auxiliary cylinder 32 is mounted on the dash pot housing and includes a piston 33 therein, FIG. 6, having a rod 34 extending outwardly from the cylinder and positioned for contact with the actuating member 31 of the switch 30 so that during movement of the piston as to the right in FIG. 6, the switch 30 is opened. A pressure equalizing conduit 35, FIG. 3, leads from the dash pot cylinder to the auxiliary cylinder 32 and has a passageway 36 therein which admits fluid to the auxiliary cylinder 32 at a pressure corresponding to the pressure in the dash pot cylinder. Fluid from the passage 36 flows through a passage 37 into the cylinder space in which the piston 33 operates so as to subject the piston 33 to the pressure in the dash pot cylinder. A spring-biased check valve 38 interposed in the passage 37 allows free entry of the fluid from the passage 36 into the working area of the cylinder in which piston 33 is disposed, but prevents its return through the passage 37. A fluid return from the working space is provided through a return port 39 communicating at respective ends with passage 36 and the cylinder space and which is restricted by an adjustable needle valve 40. The needle valve 40 is threadably mounted in a bearing support 41 so that the operator, by turning the handle 42 of the needle valve, may adjust the restricting effect on the passage 39. Thus when the dash pot plunger 16 is caused to move inwardly in the dash pot cylinder, as when the tool nears the end of its work performing stroke, the pressure in the dash pot cylinder will build up due to the restricting effect of the needle valve 18 and the same pressure will be developed in the working area of the cylinder 32 through the passage 37. This build up in pressure forces the piston 33 to the right as viewed in FIG. 6 and thus opens the switch 30 and deactivates the circuit leading to the tool retracting solenoid. When the tool reaches its final advanced position within the work, the switch 12 is closed, but the circuit to the solenoid 9 is open by reason of the opening of the switch 30. At this point in the travel of the machine tool, the other solenoid 8 is also de-energized. The plunger 16 also stops and the pressure in the dash pot cylinder quickly diminishes due to the fluid which escapes past the needle valve 18 into the reservoir. The pressure in the auxiliary cylinder 32, however, diminishes at a slower rate due to the fact that a drop in pressure in the dash pot cylinder will not cause flow of fluid in a return direction past the check valve 38. The pressure in the working area of the cylinder 32 diminishes slowly due to the restricting effect of the needle valve 40. When the pressure in the cylinder 32 has diminished to a predetermined point, a pre-set return spring 43, FIG. 6, for the piston 33 mounted on the non-pressure side thereof, will have sufficient force to move the piston 33 out of actuating contact with the switch member 31. Switch 30 then closes, and since switch 12 is closed at that time, solenoid 9 is then energized and the tool is retracted.

Thus the switch 30 will be opened upon a build up of pressure in the dash pot chamber and will be held open for a period of time after movement of the dash pot plunger stops. This period of time may be adjusted by adjusting the needle valve 40 so as to vary the restricting effect in the passage 39. Thus the tool will dwell at the end of its work performing stroke for a period of time selected by the operator and adjusted through adjustment of the needle valve 40.

In order to eliminate the circuit opening function of switch 30 in the event that the operator does not desire use of the pressure responsive dwell switch, the switch 30 may be adjustably mounted on the dash pot housing as by means of bolts 44 and 45 which are received through slots in a mounting plate for the switch and received by the dash pot housing. Thus the switch actuating member may be adjusted with the switch to a position wherein it will not be contacted by the piston rod 34 of the auxiliary cylinder. In this position the switch remains closed during the operation of the switch and allows complete control of the tool through the other switches of the tool control circuitry.

With particular reference now to unit 51, FIG. 1, switch 52, FIG. 2, and FIGS. 7-9, there is illustrated a unit for accomplishing the top dwell mentioned. A bracket 54, FIG. 1, is welded or otherwise attached to the platen 4 of the main assembly. Upon the platen 4 reaching a predetermined point in its retracting movement the horizontal arm of bracket 54 abuts the top portion of vertical arm, FIG. 7, of the top dwell assembly. The arm 55 is rigidly attached to the rod 56 which is slidably received within the upper housing 57 of the top dwell unit. The rod 56 has a fillet head 58 formed at the end opposite the vertical arm 55. Fillet head 58 is operative to engage the vertical arm 59 and transmit a force to piston 61, FIG. 9, to force piston 61 rightwardly upon attainment of the predetermined point in the retracting movement of platen 4. It will be noted that the arm 59 encircles a necked-down portion 62 and abuts face 63 of piston 61. Movement of piston 61 to the right produces a pressure increase in the hydraulic fluid in cylinder 64 formed in housing 57. The conduit 66 connects the cylinder 64 with a smaller, vertically disposed cylinder 67 formed in the housing 57. A piston 68 is slidably received within this latter cylinder and is operative at its lower end 69 to engage the contact 70 of microswitch 52.

Thus, upon platen 4 obtaining a predetermined point in its retracting movement and forcing the piston 61 rightwardly against the bias of the spring 73 through the linkages 54, 55, 56, and 59, the pressure generated in the hydraulic chamber 64 is transmitted through the conduit 66 to cylinder 67 depressing the piston 68 downwardly against the bias of the spring 74 thereby opening the normally closed microswitch 52. The microswitch 52 will remain opened so long as the pressure above piston 68 is sufficient to overcome the bias of the spring 74 which is seated against the bushing insert 75.

For the purpose of regulating the interval of time that the piston 68 is depressed a manually adjustable valve element 76 is provided in orifice 77 formed in the wall of cylinder 64. Thus, the hydraulic fluid within cylinder 64 is allowed to bleed out of the cylinder 64 at a predetermined rate to the reservoir 79. It will be apparent that spring 74 is operative to return the piston 66 to its uppermost position, thereby permitting the microswitch 70 to return to its normally closed position when the pressure in the cylinder 64 has dropped to a certain level due to the decreasing pressure caused by flow of the hydraulic fluid through the orifice 77. This corresponds to a predetermined interval of time after the platen 4 has reached its predetermined point in its retracting movement. The adjustable valve element 76, threadedly received within bushing insert 79 in the side wall of reservoir 79', determines this interval of time.

The disk 80 forms a removable end wall for the hydraulic reservoir chamber 79'. The hydraulic fluid may be added to the reservoir by removing cap screw 81. The ball check valve 82, biased in an upward direction by spring 83 seated on plug 84, prevents a flow of fluid from conduit 68 to reservoir 79' upon the pressure actuating movement of piston 61 and permits a rapid flow from the reservoir 79' when the spring 73 shifts piston 61 to the left. Conventional O-rings 86, 87, and 88 are provided to prevent leakage past pistons 61, 66 and the stem 89 of the valve 76 respectively.

The microswitch 52 is mounted to the lower housing 90 by screws 92. The cover plate 91 is removably attached to housing 90 by screws 91S. The lower housing is attached to the upper housing by screw 94 shown in phantom outline in FIG. 10. The upper housing is attached to the main assembly by screws 95. Conduit 96 is provided in one wall of lower housing 90 for the lead wires coming from microswitch 52.

A vertically slidable block 97 attached to the upper housing by the screw 98 may be positioned so that face 99 of the block will abut the interface 100 of arm 55 thereby compressing spring 73 and preventing spring 73 from moving piston 61 leftward, thereby disabling the top-dwell unit.

In operation, assuming that the platen 4 is at its maximum retracted position so that the switch 11 is closed and assuming also that the platen has been in this position for a sufficient period of time to permit the microswitch 52 to be closed, the operator may close a manual main start switch, not shown, to initiate operation. When clamping jaws 3A and 3B engage the work piece 3, so closing microswitch 3d, the solenoid 8 is energized to shift the valve spool 7 to direct the actuating fluid to move the platen 4 in a leftward, advancing direction. Upon the platen 4 obtaining a predetermined point in its advancing movement switch assembly 13 opens switch 11 and closes switch 12, thereby de-energizing the advancing solenoid 8. Just prior to the point at which the switch 11 is opened the arm 25 abuts the stops 23 of the dash-pot piston 16 thereby slowing down the advancing movement of the platen. The dash-pot piston 16 generates a pressure within the cylinder 15 which is transmitted through the conduit 36 and the ball check valve 38 to the space above the piston 33, thereby forcing the piston 33 to the right and opening the microswitch 30. With the advancing solenoid 8 de-energized by the switch 11 at the predetermined point in the advancing movement of platen 4 and the switch 12 closed by the assembly 13 the platen will remain at this point in its travel for the length of time necessary for the force due to the hydraulic pressure above piston 33 to bleed past the valve 40 and to become less than that of return spring 43. When this latter condition occurs the switch 30 will return to its normally closed position and a circuit will be completed through the switches 12 and 30 to energize the retracting solenoid 9, thereby causing the platen 4 to move in a rightward, retracting, movement. As the platen 4 moves in a rightward, retracting direction, the bracket 54 is operative to engage the arm 55 and move the piston 61 rightwardly against the bias of spring 73 and the pressure generated in cylinders 64 and 67 to provide some degree of dampening movement of the platen 4. The pressure generated within the cylinders 64 and 67 forces the piston 66 downward, thereby opening the microswitch 52. As the platen continues to move in a retracting movement a predetermined point in its travel is obtained whereby the switch assembly 13 closes the switch 11 and opens the switch 12, thereby de-energizing the retracting solenoid 9. After a new piece has been inserted between clamping jaws 3A and 3B, and the microswitch 3d is closed, and after a predetermined interval of time has expired, as determined by the setting of valve 76, the piston 68 is forced upward by spring 74, thus permitting microswitch 52 to return to its normally closed position. Since switches 52, 3d, and 11 are now closed the advancing solenoid 8 is energized and another cycle of operation begins.

The retarding and dwell time system of the present invention is extremely compact and simple and may be applied to existing reciprocatory machine tool systems. It is positive in action and its dependency on the pressure developed by the dash pot cylinder eliminates the need for complicated dwell time control circuitry which in many instances are quite complex, overly sensitive to malfunctioning, and oppressively expensive. Hence, while I have illustrated and described a preferred embodiment of my invention it is to be understood that this is capable of variation and modification, and I therefore do not wish to be limited to the precise details set forth, but desire to avail myself of such changes and alterations as fall within the purview of the following claims.

I claim:

1. A recipricatory machine tool and control therefor including a reciprocatory machine tool and power means for advancing the tool along a linear path and power means for retracting the tool along said path, a dash pot having a plunger movable in response to movement of the tool for retarding movement of the tool at a predetermined point in the advance of said tool along said path, a pressure responsive mechanism adapted to deactivate said power means for retracting said tool, means responsive to the attainment of a predetermined pressure in said dash pot for actuating said mechanism to thereby prevent retracting movement of said tool, and manually adjustable pressure-regulating means adjustable to maintain actuation of said mechanism for a continuously variable preselected period of time after said pressure drops in said dash pot.

2. A reciprocatory machine tool and control therefor including a reciprocatory machine tool and power means for advancing the tool along a linear path and power means for retracting the tool along said path, a dash pot having a plunger movable in response to movement of the tool for retarding movement of the tool at a predetermined point in the retracting movement of said tool along said path, a pressure responsive mechanism adapted to deactivate said power means for advancing said tool, means responsive to the attainment of a predetermined pressure in said dash pot for actuating said mechanism to thereby prevent advancing movement of said tool, and means adjustable to maintain actuation of said mechanism for a preselected period of time after said pressure drops.

3. A reciprocatory machine tool and control therefor including a reciprocatory machine tool and power means for advancing the tool along a linear path and power means for retracting the tool along said path, a dash pot having a plunger movable in response to movement of the tool for retarding movement of the tool at a predetermined point in the movement of said tool along said path, a pressure responsive mechanism including a switch in an energizing circuit for said power reciprocatory means, said switch being opened in response to obtainment of said pressure and adapted to deactivate said power means for movement of said tool, means responsive to the attainment of a predetermined pressure in said dash pot for actuating said mechanism to thereby prevent movement of said tool, and manually adjustable pressure-regulating means adjustable to maintain actuation of said mechanism for a continuously variable preselected period of time after said pressure drops in said dash pot, whereby the dwell of said tool at the end of the advancing and retracting strokes can be varied by adjustment of said regulating means.

4. A reciprocatory machine tool and control therefor as defined in claim 3 wherein said pressure-regulating means include a needle valve for regulating the bleed-off of fluid pressure from said pressure-responsive mechanism.

5. A reciprocatory machine tool and control therefor including a reciprocatory machine tool and power means for advancing the tool along a linear path, and power means for retracting the tool along said path, a dash pot having a plunger, means movable in response to movement of the tool for engaging said plunger and retarding movement of the tool at a predetermined point in the path of travel of the tool, a pressure responsive switch adapted when opened to reactivate said tool movement power means, said switch having an actuating member, a cylinder having a piston therein, said piston being adapted during movement thereof to contact said actuating member to open the switch, and means affording communication between the dash pot and the cylinder so that pressure in said dash pot is transmitted to said cylinder.

6. The structure of claim 5 characterized by and including means for disabling said means movable in response to movement of the tool for engaging the dash pot plunger.

7. A reciprocatory machine tool and control therefor including a reciprocatory machine tool and power means for advancing the tool along a linear path, and power means for retracting the tool along said path, a dash pot having a plunger movable in response to movement of the tool for retarding movement of the tool at a predetermined point in the path of travel of the tool, a pressure responsive switch adapted when opened to deactivate said tool power means, said switch having an actuating member, a cylinder having a piston therein, said piston being adapted during movement thereof to contact said actuating member to open the switch, means affording communication between the dash pot and the cylinder so that the pressure in said cylinder corresponds to the pressure in said dash pot, and means delaying equalization of pressure in said dash pot and cylinder after a drop in pressure in said dash pot.

8. The structure of claim 7 characterized by and including a first passage between the dash pot and cylinder and having a check valve therein allowing fluid flow to said cylinder while preventing return flow and a restricted fluid return passage between said cylinder and said dash pot.

9. The structure of claim 7 characterized by and including a unidirectional fluid supply passage between the dash pot and cylinder and an adjustably restricted fluid return passage between the cylinder and dash pot.

10. A dash pot assembly for reciprocatory machine tools having advance and return strokes controlled by electrical circuits, including a dash pot housing having a cylinder formed therein and a plunger movably mounted in said cylinder, said plunger being adapted for interconnection with a reciprocatory part of a machine tool so as to be moved into said cylinder at a predetermined point in the travel of said tool and retard movement of the tool, an auxiliary cylinder mounted on said housing, said auxiliary cylinder having a piston therein, a circuit breaking switch mounted on said housing and having an actuating member adapted for actuation by said piston upon outward movement of said piston, resilient means biasing said piston inwardly in its cylinder against the pressure of the fluid in said cylinder, and means establishing communication between the dash pot and said cylinder whereby upon inward movement of the plunger in said dash pot the increased pressure resulting therefrom is transmitted to said auxiliary cylinder to cause outward movement of said piston and cause circuit breaking movement of said actuating member, and means providing a retarded escape of fluid from said auxiliary cylinder whereby upon the occurrence of a drop in pressure in said dash pot said switch remains open for a preselected period of time.

11. The structure of claim 10 characterized by and including a check valve in a passage in said cylinder and allowing fluid flow into said cylinder from said dash pot while preventing escape through said passage and a restricted fluid escape passage leading from said cylinder.

12. The structure of claim 10 characterized by and including a passage leading from the dash pot to said cylinder and a check valve allowing fluid flow into said cylinder while preventing return flow through said passage, and a restricted return passage from said cylinder to said dash pot, said return passage having an adjustable needle valve therein so as to adjustably restrict the return passage and thereby adjust the time that said switch remains open following a drop in pressure in said dash pot.

13. The structure of claim 10 wherein said switch is adjustably mounted on said housing with relation to said piston so as to allow said switch to be moved out of actuating engagement with said piston.

14. A reciprocatory machine tool and control therefor, including a reciprocatory machine tool and fluid power means for advancing the tool and retracting the tool along a path, first and second dash pots having plungers therein and connecting linkages between said tool and said plungers so as to cause movement of said plungers into said dash pots at predetermined points in the advancing and retracting travel of said tool and retard further movement of said tool, a control valve for said power means and a pair of solenoids for actuating said valve, one solenoid being adapted during energization thereof to actuate said valve so as to cause retraction of said tool and the other solenoid being adapted when energized to cause advancing movement of said tool, a first switch adapted to close a circuit to said first solenoid when said tool reaches the end of said advancing travel, and a second switch adapted to close a circuit to said second solenoid when said tool reaches the end of said retracting travel, additional switch members in said circuit, means connecting the dash pots to the first and second additional switch members so that said additional switch members are opened upon the attainment of predetermined pressures in said dash pots and are adapted to close after the pressure in said connecting means falls below said predetermined amount, and means delaying the effect of a drop in pressure in said connecting means on said first and second pressure responsive switches so as to provide a dwell time for said tool at the end of advancing and retracting movements before said circuit is closed for the opposite movements of said tool.

References Cited in the file of this patent
UNITED STATES PATENTS

| | | |
|---|---|---|
| 2,657,595 | Shaff | Nov. 3, 1953 |
| 2,780,116 | Schafer | Feb. 5, 1957 |